Figure 2:
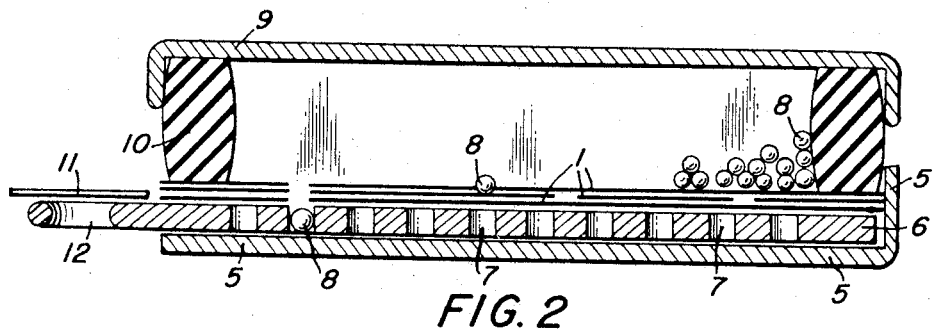

Sept. 5, 1967    F. JONKER ETAL    3,340,385
HOLE COUNTER FOR SUPERIMPOSABLE CARD SEARCH
SYSTEM, BASED ON THE USE OF BALLS
Filed March 27, 1961    2 Sheets-Sheet 1

INVENTORS
FREDERICK JONKER
DELBERT L. BALLARD

Sept. 5, 1967  F. JONKER ETAL  3,340,385
HOLE COUNTER FOR SUPERIMPOSABLE CARD SEARCH
SYSTEM, BASED ON THE USE OF BALLS
Filed March 27, 1961  2 Sheets-Sheet 2

INVENTORS
FREDERICK JONKER
DELBERT L. BALLARD

United States Patent Office 3,340,385
Patented Sept. 5, 1967

3,340,385
HOLE COUNTER FOR SUPERIMPOSABLE CARD SEARCH SYSTEM, BASED ON THE USE OF BALLS
Frederick Jonker, Washington, D.C., and Delbert L. Ballard, Bethesda, Md., assignors to Jonker Business Machines, Inc., a corporation of Delaware
Filed Mar. 27, 1961, Ser. No. 98,373
3 Claims. (Cl. 235—61.11)

This invention pertains to information retrieval systems based on the use of superimposable cards dedicated to terms and the determination of coincidence of holes in said cards. These systems are also known as Peekaboo systems. Commercially they are known as Termatrex systems.

In the Termatrex systems an item of information is prepared for entry into the system by first indexing it by a number of terms taken from a vocabulary of terms. Each item of information is also given an accession number.

Termatrex systems comprise a number of cards each dedicated to a term. In total there will generally be a vocabulary of between 500 and 5000 terms. On each termcard there is generally one place dedicated to each item of information in the collection. Each document has the same position dedicated to it on each termcard.

Items of information are entered into a Termatrex system by selecting all of the termcards by which that item has been indexed, placing these cards in superimposition in a Termatrex machine and drilling a hole in all of these cards simultaneously at the position dedicated to that item of information.

The system is searched by selecting a number of termcards together describing a search question, and placing these in superimposition in a Termatrex machine. Next, a light in the bottom of the Termatrex machine is turned on. The coinciding holes in these termcards are then visible as light dots. The serial number of these light dots can then be read off one by one, for example, by means of a transparent grid with an x–y coordinate system on it.

Sometimes this equipment is used for the collection of statistical data. In that case a number of termcards are placed in superimposition in a machine and the number of coinciding holes are counted.

This can be done by placing a lightsource behind the cards and optically scanning the same. Electronic scanning is also possible. However, these methods are extremely complex and expensive.

Mechanical card-readers are well known in the art. Most utilize mechanical feelers which under spring pressure can penetrate a hole. In doing so the feelers generally trip a microswitch. The amount of travel of these feelers is usually limited. Card scanners of this type are, therefore, generally only used to scan single cards. With superimposable cards, however, the holes are spaced so closely together that there is no room for microswitches. Moreover, sometimes up to 50 cards are placed in superimposition, so that feelers become impractical.

It is, therefore, the object of this invention to provide a simple mechanical hole counter based on the use of small balls, somewhat smaller than the size of the holes. It will be extremely simple in operation and inexpensive.

The invention will now be explained with the help of the following figures.

Figure 1:
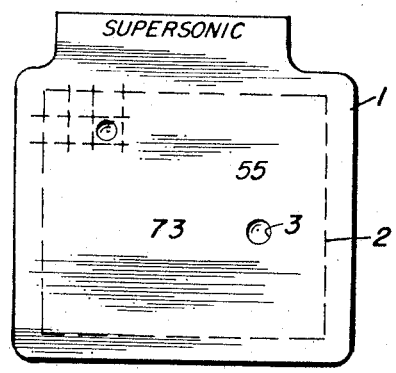
Figure 3:
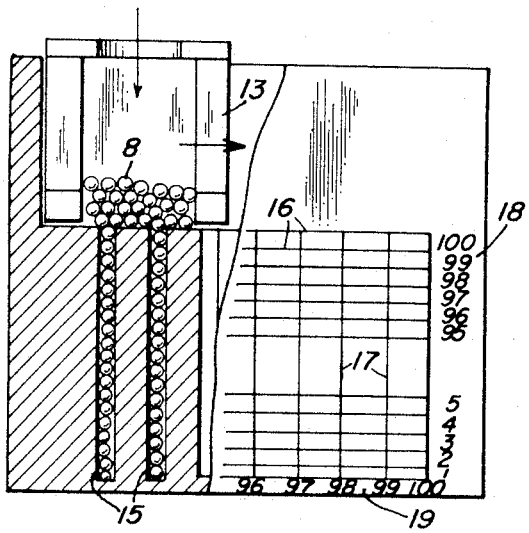
Figure 4:
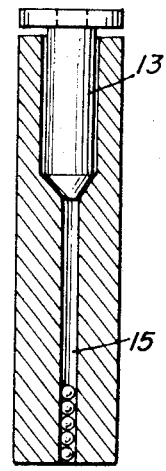
Figure 5:
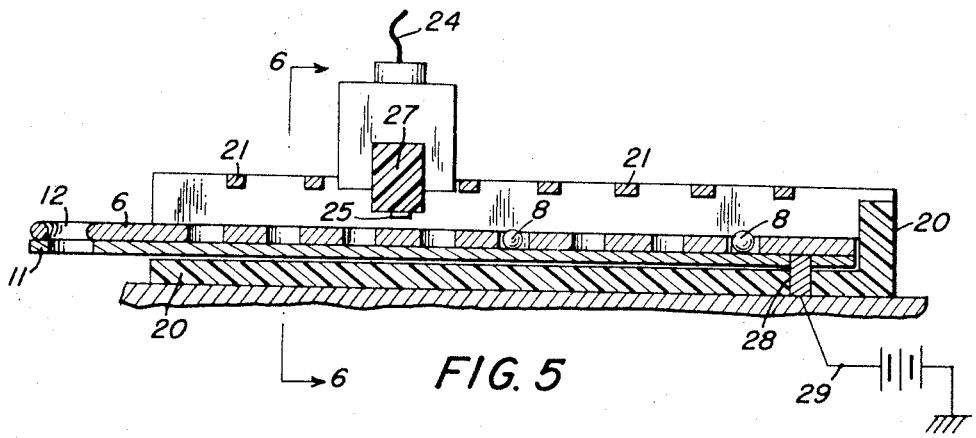
Figure 6:
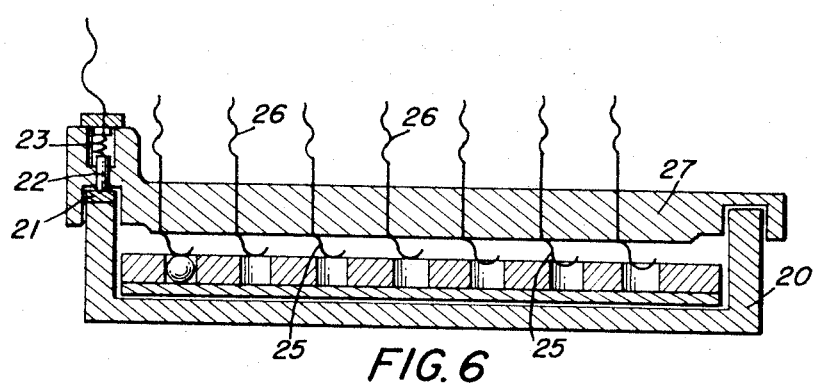
Figure 7:
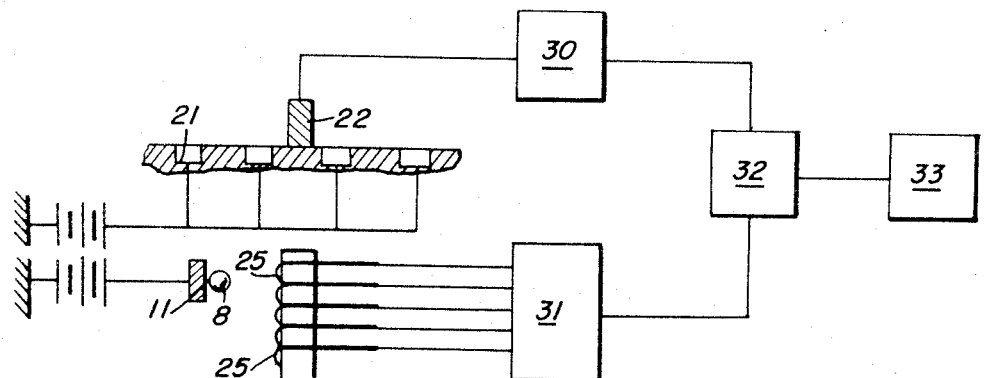

FIGURE 1 shows an example of a termcard.
FIGURE 2 shows a cross section of the device.
FIGURES 3 and 4 show two views of the ball counting device.
FIGURES 5 and 6 show two views of a device that also gives positional information.
FIGURE 7 shows a bloc diagram of the electronics of the installation of FIGURES 5 and 6.

FIGURE 1 shows an example of a termcard 1, dedicated to the term "supersonic." The area 2, shown in dashed lines, contains, for example, 10,000 positions each dedicated to a document, in such a manner that the serial number of a document can be read off by means of the x–y cordinates of the position. For example, for a card having a matrix of 100×100 positions, hole 3, having as coordinates 55 and 73 represents document #5573.

The counter of coincidence of holes, comprises a template 6 having holes 7 at each of the positions of the cards, large enough to hold one and only one of the balls 8.

The template 6 is placed in an alignment frame 5. On top of it the termcards are placed.

This assembly is placed upside down upon the ballholder. Normally this ballholder comprising a bottom piece 9 and a rubber wall 10 all around its edges, sits upon its bottom piece 9 with a large supply of balls 8 in it. The assembly of template 6, cards 1 and alignment frame 5 are then upside down placed upon the ballholder.

Next this entire assembly is reversed and shaken until at every coincidence of holes between all of the cards, a ball drops through into the corresponding hole in the template 6. Next a plate 11 is shoved between the bottom card and the template 8. The assembly is reversed, and the template having one ball for every coincidence of holes can then be removed with the plate 11 under it.

These balls can then be dropped into the ball counter shown in FIGURES 3 and 4. For a matrix of 100×100 positions on each card, the ball counter could best comprise a row of 100 tubes 15, each wide enough for one ball and long enough for, for example, 100 balls. If the entire assembly is made of transparent plastic, a grid can be printed on it to read out the exact count. This grid comprises 100 horizontal lines 16, 100 vertical lines 17, a vertical scale 18 and a horizontal scale 19. The count is read off at the position of the last ball from the two coordinates of the grid. If these x and y coordinates are respectively 25 and 17, the count is 2517.

Movable member 13 in the ball counter assures that the tubes 15 will be filled from left to right and that each will be fully filled. The balls are poured through an opening in the top of this member. As it is moved from left to right, the holes 15 are filled up.

It is also possible to arrive at positional information regarding the holes by reading off the coordinate positions automatically and feeding these into an electronic memory and print-out device. A device to sense the coordinates is shown in FIGURES 5 and 6, which show two different cross-sections.

The template 6 with the balls 8 in it and the plate 11 under it are placed in a frame 20. Sliding across frame 20 is carriage 27. It has a number of contacts 25, one for each row of hole positions of the template. Wires 26 lead out from these contacts to an electronic device. The contacts 25 are set so as not to touch the plate 6, but only the balls 8 which have a somewhat larger diameter than the thickness of the template 6.

While the contacts 25 can read the position of a ball in the x directions, its position in the y direction is read off by means of contacts 21 in the edge of frame 20. A brush 21 is held under pressure of spring 23 against the edge of frame 20. A wire 24 leads from this brush to an electronic counter, well known in the art, that counts the number of the contacts 21 that the carriage 27 has passed. This information is then fed into an electronic device which activates a printer.

Frame 20 is made of plastic. However, a contact 28 and a wire 29 connects the template 6, the plate 11 and the balls 8 to a source of potential. Each of the contacts 21 is likewise connected to a source of potential. Carriage 27 is likewise made of plastic.

FIGURE 7 shows a bloc diagram of the electronics. Numeral 30 designates an electronic counter, well known in the art, numeral 31, a device, that translates each of the 100 positions into a digital reading. Such devices are likewise well known in the art. Numeral 32 designates the electronic memory and 33, the print-out device.

The invention is not limited to the embodiments and modifications shown but encompasses all embodiments comprised within the claims.

What we claim is:

1. Apparatus for sensing the coordinate positions of balls contained in a template having ball-receiving recesses arranged in a regular array, comprising a frame for receiving said template, ball-sensing contact means mounted on said frame for movement thereover to complete an electrical circuit at each position of the template wherein it contains one of said balls, and means controlled by said contact means for indicating the coordinate positions at which said circuit is completed.

2. Apparatus for sensing and registering the coordinate positions of balls contained in a template having ball-receiving recesses arranged in a coordinate array, comprising a frame for receiving such a template, ball-sensing multiple contact means mounted on said frame for movement parallel to one coordinate axis of said array to complete respective electrical circuits corresponding to the coordinates of said balls, and means controlled by said circuits for registering the coordinate positions of said balls.

3. Apparatus for sensing and registering the number of balls contained in each row of a template having ball-receiving recesses arranged in a coordinate array of columns and rows, comprising a frame for receiving such a template, ball-sensing multiple contact means mounted on said frame for movement parallel to one coordinate direction of said array to complete respective electrical circuits corresponding to the coordinates of said balls, and means controlled conjointly by (a) the activation of said multiple contact means and (b) the movement of said frame, for registering the number of balls contained in each row of said array.

References Cited

UNITED STATES PATENTS

| | | | |
|---|---|---|---|
| 516,984 | 3/1894 | Clark | 235—68 |
| 667,804 | 2/1901 | Swaren | 235—123 |
| 1,902,085 | 3/1933 | Lee et al. | 235—61.11 X |
| 1,966,695 | 7/1934 | Schaack | 235—123 |
| 2,113,634 | 4/1938 | Tauschek | 235—61.11 |
| 2,688,443 | 9/1954 | Leonard | 235—61.11 |
| 2,872,664 | 2/1959 | Minot | 235—61.11 |
| 2,915,243 | 12/1959 | LaPointe | 340—173 |
| 2,980,320 | 4/1961 | LaPointe | 340—173 |
| 3,011,156 | 11/1961 | MacPherson | 340—173 |

MAYNARD R. WILBUR, *Primary Examiner.*

WALTER W. BURNS, Jr., MALCOLM A. MORRISON, D. W. COOK, P. J. HIRSHKOP, *Assistant Examiners.*